May 25, 1937.  B. J. UKROPINA  2,081,313
CONCRETE PIPE JOINT
Filed Feb. 26, 1936
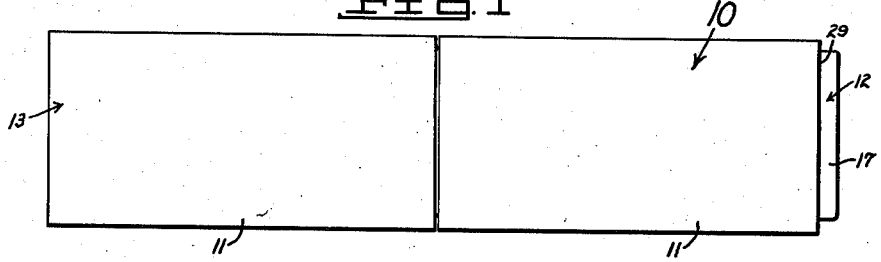
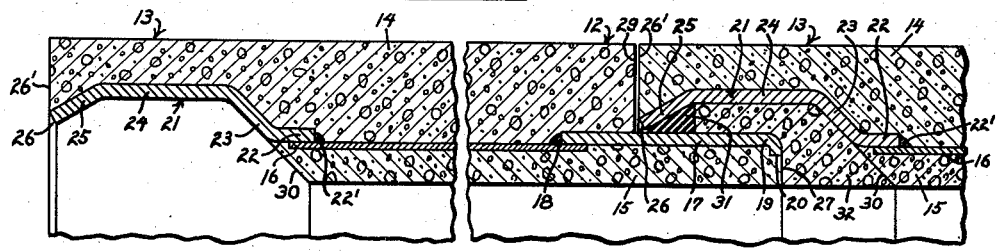
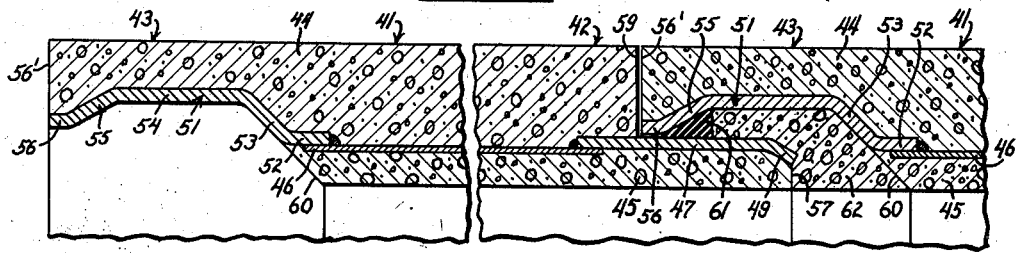
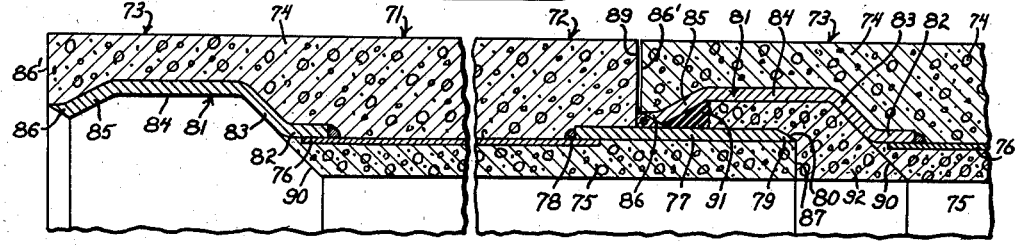
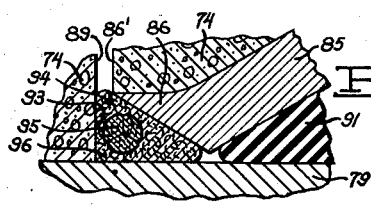
INVENTOR.
B. J. UKROPINA
BY
ATTORNEY Patented May 25, 1937

2,081,313

UNITED STATES PATENT OFFICE 2,081,313

CONCRETE PIPE JOINT

Bozidar J. Ukropina, Los Angeles, Calif.

Application February 26, 1936, Serial No. 65,808

2 Claims. (Cl. 138—85)

This invention relates to improvement in concrete pipes.

The general object of the invention is to provide a concrete pipe having an improved joint.

Another object of the invention is to provide a concrete pipe including a plurality of lengths wherein impervious members are embedded between an inner layer and an outer layer of concrete, and wherein novel means is provided for providing a fluid tight joint between lengths of the pipe.

Another object of the invention is to provide a concrete pipe joint wherein novel means is provided for initially sealing the joint prior to the caulking so that the inner surface of the pipe will not be wet when the pipe is laid in a trench containing water.

An additional object of the invention is to provide a concrete pipe including a plurality of lengths each of which includes a bell member and a spigot member made of metal and wherein the bell member includes a circular corrugation which extends entirely around the end of the pipe to reinforce the same and also to provide a chamber in conjunction with a spigot member.

Other objects and the advantages of the invention will be apparent from the following description taken in connection with the accompanying drawing, wherein:

Fig. 1 is a side elevation showing a concrete pipe conduit including a plurality of lengths of pipe embodying the features of my invention;

Fig. 2 is an enlarged, fragmentary, section showing a completed joint between two lengths of pipe;

Fig. 3 is a view similar to Fig. 2 showing a modified form of my invention;

Fig. 4 is a view similar to Fig. 2 showing a further modification of my invention; and Fig. 5 is a sectional detail showing the initial sealing means.

Referring to the drawing by reference characters I have indicated a concrete pipe embodying the features of my invention generally at 10. As shown this pipe comprises a plurality of lengths 11 which are preferably similar and which are provided with a spigot end 12 and a bell end 13.

As shown each length of pipe includes an outer layer of concrete 14 and an inner layer of concrete 15 with a tubular, metal, reinforcing, member 16 embedded between the inner and outer layers of concrete.

At the spigot end of each length a tubular, metal, spigot, member 17 is secured to the reinforcing member 16 as by welding at 18 although the spigot member may be secured in any desirable manner. The spigot member is shown as cylindrical throughout its entire length and is provided with an end portion 19 which is rolled inwardly to provide an inwardly directed curved flange 20.

The bell end is provided with a metal bell member 21 which includes a cylindrical portion 22 secured to the reinforcing member 16 by welding as at 22′ and an integral outwardly flared portion 23, a cylindrical portion 24 and an inwardly flared portion 25 which terminates at 26 in an end face which is frusto-conical in shape and is inclined at an angle to the axis of the pipe length.

The outer layer of concrete 14 terminates at the bell end at 26′ at a location flush with the end 26 of the bell member. The inner layer of concrete 15 at the spigot end terminates flush with the end of the flange 20 of the spigot member as indicated at 27. The outer layer of concrete at the spigot end terminates at a location spaced from the end face 26 of the spigot member 21 as indicated at 29, while the inner layer of concrete of the bell end is set back and bevelled as at 30 in line with the outwardly flared portion 23.

The outer diameter of the spigot member is slightly less than the inner diameter of the end face of the bell member so that the two may be easily assembled with the frusto-conical end face of the bell member engaging and sliding along the curved flange 20 at the end of the spigot. The outer and the inner diameters of the spigot member are substantially the same as the outer and inner diameters, respectively, of the cylindrical portion 22 of the bell member.

After the parts are assembled as shown in Fig. 2 lead or other caulking material 31 is inserted in the tapered portion of the space between the spigot member and the bell member and after this is tamped in place a filling of cement 32 is inserted to complete the joint.

In Fig. 3 I show a modification of my invention as comprising a plurality of lengths 41 which are preferably similar and which are provided with a spigot end 42 and a bell end 43. As shown each length of pipe includes an outer layer of concrete 44 and an inner layer of concrete 45 with a tubular metal reinforcing member 46 inserted between the inner and outer layers.

A spigot member 47 is secured to the reinforcing member and is shown as cylindrical and as provided with an end portion 49 which is bent or flared inwardly.

The bell end is provided with a bell member 51 which includes a cylindrical portion 52 secured to the reinforcing member 46 and an outwardly flared portion 53, a cylindrical portion 54 and an inwardly flared portion 55 which terminates in an end cylindrical portion 56. The outer layer of concrete terminates at the bell end at 56' at a location flush with the plane end 56 of the bell member 51, while the inner layer of concrete at the spigot end terminates flush with the end 49 of the spigot member as indicated at 57. The outer layer of concrete at the spigot end terminates at a location spaced from the end of the spigot member as indicated at 59, while the inner layer of concrete of the bell end is set back and bevelled as at 60 in line with the outwardly flared portion 53.

The outer diameter of the spigot member is slightly less than the inner diameter of the bell member so that the two may be assembled with the end of the bell member engaging the flared end portion 49 at the end of the spigot so that the parts may slide together readily. The outer and the inner diameters of the spigot member are substantially the same as the outer and inner diameters, respectively, of the cylindrical portion 52 of the bell member.

After the parts are assembled as shown in Fig. 3 lead or other caulking material 61 is inserted in the space between the spigot member and the bell member and after this is tamped in place a filling of cement 62 is inserted to complete the joint.

In Figs. 4 and 5 I show a modification which comprises a plurality of lengths 71 which are preferably similar and which are provided with a spigot end 72 and a bell end 73.

As shown each length of pipe includes an outer layer of concrete 74 and an inner layer of concrete 75 with a tubular metal reinforcing member 76 inserted between the inner and outer layers.

At the spigot end of each length a tubular spigot member 77 is secured to the reinforcing member 76 as by welding at 78. The spigot member is shown as cylindrical throughout its entire length and is provided with an end portion 79 which is bevelled inwardly as at 80.

The bell end is provided with a bell member 81 which includes a cylindrical portion 82 secured to the reinforcing member 76 and an outwardly flared portion 83, a cylindrical portion 84 and an inwardly flared portion 85 which terminates at 86 in an end which is bevelled and is inclined at an angle to the axis of the length. The outer layer of concrete terminates at the bell end at 86' flush with the end 86 of the bell member, while the inner layer of concrete at the spigot end terminates flush with the end of the spigot member as indicated at 87. The outer layer of concrete at the spigot end terminates at a location spaced from the end of the spigot member as indicated at 89, while the inner layer of concrete of the bell end is bevelled as at 90 in line with the outwardly flared portion 83.

The outer diameter of the spigot member is slightly less than the inner diameter of the bell member so that the two may be assembled with the bevelled end portion 86 of the bell member engaging the bevelled end 80 of the spigot so that the parts may slide together readily. The outer and the inner diameters of the spigot member are substantially the same as the outer and inner diameters, respectively, of the cylindrical portion 82 of the bell member.

After the parts are assembled as shown in Fig. 2 lead or other caulking material 91 is inserted in the space between the spigot member and the bell member and a filling of cement 92 is inserted to complete the joint.

At the end of the bevelled portion 86 a chamber 93 is provided between this portion, the end 89 of the outer layer of concrete 74 at the spigot end, and the spigot ring. (See Fig. 5.) A normally round caulking member 94 which may be a heavy rope or hawser 95 having asphaltum 96 thereon is arranged on the spigot member while the joint is being made and when the bell member is moved to the place the caulking member 94 is distorted and comforms to the shape of the chamber 93 to provide a temporary caulking to exclude water from the pipe (when the latter is laid in a trench) prior to the insertion of the caulking 91.

It will be noted that the bell members 21, 51, and 81, each provide a circular corrugation which extends around the entire pipe to form a chamber. As is well known, such a corrugation produces a stiffening effect and, as a result of my arrangement, the metal forming the bell is reinforced so that it is not apt to be dented or distorted yet the facility with which the joint may be made is not impaired.

From the foregoing description it will be apparent that I have provided a novel pipe joint which can be economically manufactured and installed.

Having thus described my invention I claim:

1. A fluid conduit comprising a plurality of lengths of pipe, each of said lengths including a reinforcing tube, a bell member secured at one end to said tube and a spigot member secured at the other end to said tube, said spigot member comprising a cylindrical tube having its extreme end portion inwardly curved to provide an inwardly directed flange arranged at right angles to the axis of the length, said bell member comprising a cylindrical portion engaging said reinforcing tube, an outwardly flaring portion connected to said cylindrical portion, a second cylindrical portion connected to said outwardly flared portion and an inwardly flared portion connected to said second cylindrical portion, said inwardly flared portion having its end face in frusto-conical form, the diameter of the inner periphery of said frusto-conical end face being slightly greater than the diameter of said spigot member to provide a sliding fit thereon, the inner diameter of said second cylindrical portion being greater than the outer diameter of the spigot member to provide a chamber, said spigot member terminating intermediate the ends of the chamber, a caulking material in the chamber surrounding said spigot member and a cement filling in the chamber at the end of said caulking material.

2. A fluid conduit comprising a plurality of lengths of concrete pipe, each of said lengths including a reinforcing tube, a bell member secured at one end to said tube and a spigot member secured at the other end to said tube, said spigot member comprising a cylindrical tube having its extreme end portion inwardly directed, said bell member comprising a cylindrical portion engaging said reinforcing tube, an outwardly flaring portion connected to said cylindrical portion, a second cylindrical portion connected to said outwardly flared portion and an inwardly flared portion connected to said second cylindrical portion, said inwardly flared portion having its end face arranged at an angle to the axis of the bell member, the diameter of the inner periphery of said end face being slightly greater than the diameter of said spigot member to provide a sliding fit thereon, the inner diameter of said second cylindrical portion being greater than the outer diameter of the spigot member to provide a chamber, a caulking material in the chamber surrounding said spigot member and a cement filling in the chamber at the end of said caulking material.

BOZIDAR J. UKROPINA.